May 10, 1927.  T. OLINGER ET AL  1,627,572

PULLEY

Filed Sept. 20, 1926

Inventor
Thomas Olinger
Fred G. Brendel
By Frank E. Liverance, Jr.
Attorney.

Patented May 10, 1927.

1,627,572

UNITED STATES PATENT OFFICE.

THOMAS OLINGER AND FRED G. BRENDEL, OF HOLLAND, MICHIGAN, ASSIGNORS TO FEDERAL MANUFACTURING COMPANY, OF HOLLAND, MICHIGAN, A CORPORATION OF MICHIGAN.

PULLEY.

Application filed September 20, 1926. Serial No. 136,492.

This invention relates to a pulley which, preferably, is made entirely of sheet metal. It is a primary object and purpose of the present invention to construct a pulley in an exceptionally simple and economical manner and to make the same so that it will be durable and efficient in service. A primary feature of the invention resides in the manner in which the pulley is mounted in its housing, the construction therefor being one that is particularly practical, serviceable and durable in service, pulleys of this character being extensively used in furnace installations for carrying the chains which are used to regulate the check and draft dampers or doors of furnaces.

For an understanding of the invention and the construction embodying the same, reference may be had to the following description taken in connection with the accompanying drawing, in which, Fig. 1 is a perspective view of the complete pulley.

Like reference characters refer to like parts in the different figures of the drawing.

Figure 1:
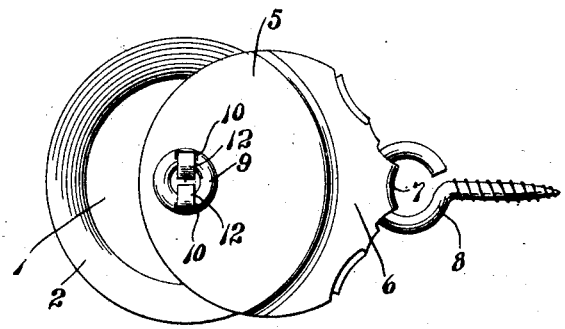
Figure 2:
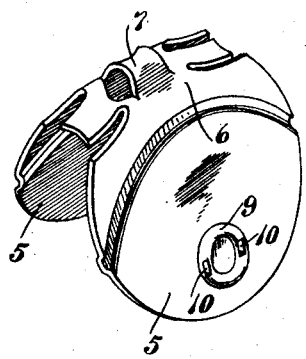
Fig. 2 is a perspective view of the housing therefor before the pulley itself is connected therewith.

The pulley is made from sheet metal and includes a circular web 1 which is outwardly dished toward its center and at its outer edges is formed into a curved flange 2 so that when two of the parts are placed together back by back the flanges 2 provide a continuous groove around the pulley. At the center of each of the webs 1 an opening is made through which a cylindrical sleeve 3 of sheet metal is passed, its ends being turned outwardly to make flanges 4 whereby the two halves of the pulley are securely bound and held together.

The pulley housing is of sheet metal being formed from a single plate of sheet metal and having two parallel sides 5 which are connected at their upper ends by a cross connecting integral piece 6 from which a loop 7 is pressed upward, as shown. Through this loop the eye of a screw eye 8 may be passed, the threaded shank of the screw being adapted to be screwed into any suitable support for the pulley.

Figure 4:
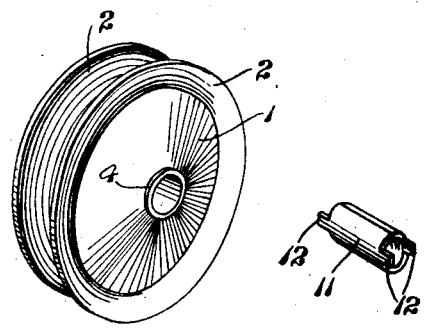
Fig. 4 is a perspective view of a sheet metal journal upon which the pulley is mounted and which is used not only to mount the pulley but to connect the sides of the housing.
Figure 3:
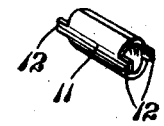
Fig. 3 is a perspective view of the sheet metal pulley.
Figure 5:
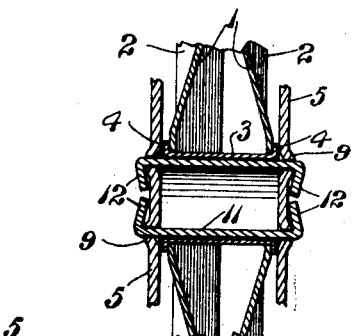
Fig. 5 is an enlarged horizontal section through the pulley at the point of rotatable mount thereof.
Figure 6:
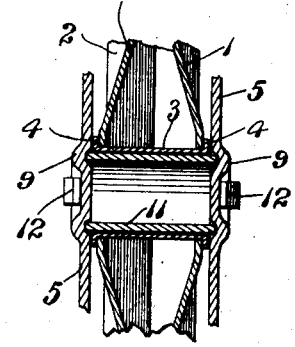
Fig. 6 is a vertical section at the same point.
Figure 7:
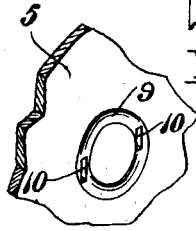
Fig. 7 is a fragmentary enlarged perspective view of one side of the pulley housing.

The pulley itself which has been described, is located between the sides 5 of the housing. In each of the sides 5 a circular outwardly extending embossing 9 is made at diametrically opposed points in which openings 10 are cut. A journal 11 formed from a single piece of sheet metal is rolled into cylindrical form, as shown in Fig. 4, and at each end has two diametrically opposed tangs 12 which extend in the direction of the length of the journal. This cylindrical journal 11 passes through the sleeve 3 and at its ends seats in the circular grooves at the inner sides of the sides 5 of the housing made by the embossings 9, while the tangs 12 pass through the openings 10 and are then bent inwardly toward each other so as to permanently secure the parts together.

The pulley thus made is of very simple construction. The sleeve 3 turns readily on the journal 11 and there is no possibility of any binding which would interfere with the free rotation of the pulley. The construction is a very practical one, all parts being made very expeditiously from sheet metal on a punch press and the assembly being very quick and easy. The invention is defined in the appended claims and is to be considered comprehensive of all forms of structure coming within their scope.

We claim:

1. In combination with a pulley housing having spaced apart sides, of a pulley having a central opening therethrough, and a cylindrical journal having tangs extending from each end thereof passing through the opening in the pulley, the ends of the journal bearing against the inner sides of the sides of the housing and said tangs passing through the sides of the housing and bent against the outer sides of said sides of the housing.

2. In combination with a pulley housing having spaced apart sides, each being formed with a circular embossing therein pressed outwardly so as to provide a circular groove at the inner side of each side of the housing, a pulley located between the sides of the housing having a central opening therethrough, and a hollow cylindrical journal provided with tangs projecting at each end thereof passing through the opening in the pulley and having its ends seated in said circular grooves, said tangs passing through the sides of the housing and being clenched against the outer sides thereof.

3. In combination with a pulley housing having spaced apart sides and an upper connecting portion integrally made from a single piece of sheet metal, of a sheet metal pulley disposed between the sides of the housing having a central opening therethrough, a hollow cylindrical journal of sheet metal passing through said opening in the pulley and provided with tangs at its ends which pass through the sides of the housing and are clenched against the outer sides thereof.

4. In combination with a pulley housing having spaced apart parallel sides, each being provided with an outwardly extending circular embossing whereby circular grooves are made at the inner sides of the sides of the housing, each of said embossings having a plurality of openings therethrough, of a pulley comprising two parts placed back to back, each having a central opening therethrough and a hollow sleeve passing through said openings and having means at it's ends for binding the parts of the pulley and the sleeve together, and a hollow cylindrical journal equipped with a plurality of tangs at each end passing through said sleeve and at its ends seating in the grooves of said embossings, said tangs passing through the openings made through said embossings and clenched against the sides of the housing.

In testimony whereof we affix our signatures.

THOMAS OLINGER.
FRED G. BRENDEL.